(12) United States Patent
Loewen et al.

(10) Patent No.: US 7,575,178 B2
(45) Date of Patent: Aug. 18, 2009

(54) HEAT RECOVERY APPARATUS

(76) Inventors: Kim Loewen, 882 Manor Heights, Martensville, Saskatchewan (CA) S0K 2T0; Gina Gaida, 882 Manor Heights, Martensville, Saskatchewan (CA) S0K 2T0

( * ) Notice: Subject to any disclaimer, the term of this patent is extended or adjusted under 35 U.S.C. 154(b) by 670 days.

(21) Appl. No.: 11/220,315

(22) Filed: Sep. 6, 2005

(65) Prior Publication Data

US 2007/0051820 A1    Mar. 8, 2007

(51) Int. Cl.
F24H 9/20 (2006.01)
F24F 11/04 (2006.01)
F24F 7/00 (2006.01)

(52) U.S. Cl. ............... 236/10; 236/38; 236/49.3; 237/53; 237/55; 126/110 R; 432/201

(58) Field of Classification Search ............ 237/55, 237/53; 122/7 R; 432/200, 201; 236/49.3, 236/10, 38; 126/79, 110 R
See application file for complete search history.

(56) References Cited

U.S. PATENT DOCUMENTS

| 114,013 | A | | 4/1871 | Jennings |
|---|---|---|---|---|
| 2,147,658 | A | | 2/1939 | Lefick |
| 2,174,710 | A | * | 10/1939 | Wagner ............ 237/2 R |
| 2,882,023 | A | | 4/1959 | Rizzo |
| 3,404,674 | A | | 10/1968 | Albert |
| 3,934,798 | A | | 1/1976 | Goldsmith |
| 4,147,303 | A | * | 4/1979 | Talucci ............ 237/55 |
| 4,308,990 | A | * | 1/1982 | Borovina et al. ...... 236/10 |
| 4,312,320 | A | * | 1/1982 | Jennings ............ 126/79 |
| 4,313,562 | A | | 2/1982 | White |
| 4,416,254 | A | * | 11/1983 | DiPietro ........... 126/307 A |
| 4,467,959 | A | | 8/1984 | Laviguer |
| 4,596,288 | A | | 6/1986 | Knoch |
| 4,928,751 | A | * | 5/1990 | Fischer, Jr. ........ 165/11.1 |
| 5,311,930 | A | | 5/1994 | Bruenn |
| 5,944,090 | A | | 8/1999 | Teal |
| 6,014,966 | A | | 1/2000 | Stevenson |
| 6,497,199 | B2 | * | 12/2002 | Yamada et al. ...... 122/367.1 |

FOREIGN PATENT DOCUMENTS

GB    125.689    4/1919
GB    1326    2/2002

* cited by examiner

*Primary Examiner*—Marc E Norman
(74) *Attorney, Agent, or Firm*—Michael I. Kroll

(57) ABSTRACT

An apparatus for extracting heat from a heat source comprising a housing having a first end with a first opening and a second end with a second opening. The housing includes an internal compartment therein and the first end of the housing is connected to said heat source. A channel extends from the housing for providing access to the internal compartment. A hollow conduit is positioned within the internal compartment extending between the first opening and the second opening. A plurality of members are positioned on an exterior surface of the conduit and along the length thereof. The members are able to absorb heat from within the conduit and release the absorbed heat into the internal compartment creating heated air. The apparatus includes a means for drawing air through and expelling air from said conduit and means for moving said heated air out from said internal compartment to a second compartment. The apparatus is activated via means connected to each of the drawing means and the moving means. Upon activation of the apparatus, the drawing means draws the air through the conduit and expels air from the housing and the heated air is moved from within the internal compartment to the second compartment via the moving means for further distribution thereof.

15 Claims, 7 Drawing Sheets

HEAT RECOVERY APPARATUS

BACKGROUND OF THE INVENTION

1. Field of the Invention

The present invention relates generally to heating systems and, more specifically, to a heating recovery apparatus designed to recover lost heat from a primary heating source. The apparatus is used in conjunction with a boiler and/or furnace. The apparatus includes a jacket for a flue having conduit clad in heatsinks and a fan moving air across a channel and discharged into a plenum. The apparatus also includes a fan positioned within to expel gases. An exteriorly positioned fan control mechanism with temperature display is in communication with temperature sensors and serves to activate the fans.

2. Description of the Prior Art

There are other heat recovery apparatus. Typical of these is U.S. Pat. No. 114,013 issued to R. Jennings on Apr. 25, 1871.

Another patent was issued to S. F. Rizzo on Apr. 14, 1959 as U.S. Pat. No. 2,147,658. Yet another U.S. Pat. No. 3,404,674 was issued to K. G. Albert on Oct. 8, 1868 and still yet another was issued on Apr. 3, 1979 to Anthony Talucci as U.S. Pat. No. 4,147,303.

Another patent was issued to Ralph H. White on Feb. 2, 1982 as U.S. Pat. No. 4,313,562. Yet another U.S. Pat. No. 4,467,959 was issued to Charles F. Laviguer on Apr. 28, 1984. Another was issued to Darrell G. Knoch on Jun. 24, 1986 as U.S. Pat. No. 4,596,288 and still yet another was issued on Jun. 24, 1986 to Darrell G. Knoch as U.S. Pat. No. 4,596,288.

Another patent was issued to Paul R. Bruenn on May 17, 1994 as U.S. Pat. No. 5,311,930. Yet another U.S. Pat. No. 5,944,090 was issued to William J. Teal on Aug. 31, 1999. Another was issued to James R. Stevenson on Jan. 18, 2000 as U.S. Pat. No. 6,014,966.

An international patent was issued to Max Becker on Feb. 27, 1902 as U.K. Patent No. GB 1326. Another international patent was issued to John Everett Bell on Apr. 28, 1919 as U.K. Patent No. GB 125,689

My invention has for its object to furnish an improved apparatus for heating the rooms of a building by introducing into them a supply of pure heated air, and which shall, at the same time, be simple in construction, easily applied, and effective in operation. It consists in the construction of the various parts of the apparatus as hereinafter more fully described. A represents an ordinary stove, and B represents a chimney, which may be made with or without a fireplace, as may be desired. C is a drum, the outer case or shell of which is connected at its lower end with the egress smoke-flue of the stove. The upper end or part of the drum C has a pipe, D, connected with it to conduct the smoke and other heated products of combustion to the chimney B. The ends or heads of the drum C may be made conical, as shown in the drawing, or flat, as may be desired. When the upper head is made conical the pipe D should be connected with its apex; but when made flat the said pipe D may be connected with the said head or with the upper part of the side of the drum C as may be desired.

Broadly speaking, this invention aims to provide novel means for making use of the heat which would otherwise go to waste in the products of combustion proceeding from a stove or similar heater. Another object of the invention is so to construct the device that the air may be forced through it advantageously. Another object of the invention is to supply novel means for cleaning the conduits through which the products of combustion pass. It is within the province of the disclosure to improve generally and to enhance the utility of devices of that type to which the present invention appertains.

The invention comprises heat exchanger apparatus and controls for using flue gas heat to heat selected air and directing it to a space to be heated within a predetermined temperature range. The controls include a solenoid actuated by a space temperature controlling thermostat, at its lower temperature limit, so that the solenoid operates an aquastat including a thermostat in the medium that a burner normally heats, to raise the operative temperature range at which the flue gas emanating burner ordinarily turns on and off. When the air directed over the heat exchanger raises the space temperature to its predetermined upper limit, the aquastat acts to return the burner controls to turn the burner on and off, as under ordinary conditions.

A heat-saving attachment in the nature of a jacket surrounding the smoke pipe of a furnace located in a basement or other relatively unheated space. Air is drawn from the unheated space or other area into the annular space between the jacket and smoke pipe, absorbing heat from the exterior of the pipe as it is directed through laterally disposed baffle means within the annular space from whence it is directed through a warm air duct to a space to be heated. Electrical controls may be provided to establish predetermined time delays between turning on and off of the furnace burner and respective on and off controls of an intake fan for drawing air from the unheated space into the jacket.

A heat ventilator for insertion in a flue pipe above stoves and the like, wherein a double walled connector spaces the ventilator from the stove and establishes an annulus heating air delivered into a housing by convection, there being a smooth-walled flue tube extending longitudinally through the housing establishing a passage occupied by a stack of spaced parallel plates transversely disposed and engaged over said flue tube to absorb and dissipate heat into useful air transported by a motor fan through a downwardly open plenum receiving useful air from around said stove and discharging the same over said plates and into a living area.

A heat exchanger and vaporizer adapted for mounting on an existing flue for utilizing heat which is otherwise lost and for providing moisture for space heating and conditioning. The heat exchanger and vaporizer includes a central stack for unimpeded transport of flue gases; a casing, with air inlet and outlet, enveloping the stack; a vaporizer contained within the casing for efficient heat transfer and for room conditioning; and a motor-fan unit for producing an airflow through the casing. The vaporizer is in the form of non-corrosive heat conductive helical tubing for maximizing heat transfer in a given volume, for maintenance free use and for convenience in assembly. The vaporizer is provided with a plurality of vapor vents on its upper surface and a pour spout located externally of the casing.

The heat recovery device includes a section of standard flue pipe carrying a single row of a plurality of hollow, cylindrical heating tubes extending diametrically through the flue pipe section and a separate housing defining an air flow chamber surrounding the portion of the flue pipe section containing the heating tubes. A fan inside the housing draws ambient air into the housing and propels a flow of air toward a heated air outlet, both through the heating tubes and over the outer surface of the flue pipe section. A catalytic combustor for reducing air pollutants and potential creosote deposits is mounted in the flue pipe section upstream of the heating tubes. The flue pipe assembly is removably mounted on the housing so it can be removed in the event it fatigues and/or becomes plugged with carbon or creosote deposits during use. A thermostat on the flue pipe section turns the fan on and off when the temperature in the flue pipe section is respectively above and below a predetermined temperature.

A device for reclaiming waste heat from cooking appliances. The device includes a baffle through which exhaust from the cooking appliance flows, an inlet for receiving exhaust from the cooking appliance, and an outlet for venting exhaust to the atmosphere outside the building or vehicle in which the cooking appliance is located. The baffle extracts heat from the exhaust as the exhaust flows therethrough. The baffle is in thermal communication with a heat sink that directs the extracted heat to the building or vehicle spaces to be heated. The heat reclamation device has a generally thin profile so that the device may be installed above and behind the work surface of the cooking appliance so as to consume a minimal amount of space while not interfering with the normal use of the appliance. The heat reclamation device has means to vent the exhaust directly to the atmosphere, bypassing the baffle.

A heat exchanger for a furnace flue comprises an outer flue jacket having a plurality of axially parallel exhaust gas passages therethrough. The exhaust gas passage tubes are sealed from the remainder of the interior volume of the jacket by a baffle plate at each end thereof. The outer flue jacket is preferably of the same diameter as the flue pipe in the remainder of the system, e.g., six or eight inches, in order to preclude any requirement for adapters. An inlet pipe and an outlet pipe are affixed to opposite ends of the jacket, at some angle (e.g., normal) thereto. Exhaust gases from the furnace pass through the plurality of pipes within the outer jacket, heating the pipes. Airflow within the jacket and outside the pipes, is warmed by contact with the pipes, and flows from the outlet end to be used for warming the interior of the structure in which the unit is installed. A fan may be provided at either the inlet or outlet pipe, preferably at the inlet, to force air through the jacket and around the internal pipes. The fan may be a constant speed unit, or may include a variable speed control, and may be actuated by a parallel circuit to the main furnace blower motor, or by a separate thermostat. Preferably, the rate of flow of air provided by the fan is at least approximately equal to the rate of flow of exhaust gases through the flue, for optimum heat transfer.

A heat exchange device for harnessing heat from an exhaust vent is provided including a furnace having a main inlet for receiving cooled air suctioned from a living area, a heating mechanism for heating the cooled air suctioned from the living area, a main outlet for delivering air to the living area which is heated by the heating mechanism, and an exhaust vent coupled to the furnace for expelling air associated with the generation of heat by the heat mechanism with such expelled air not being fit for channeling to the living air via the outlet. Next provided is a housing which divides the exhaust vent into a lower portion and an upper portion. The housing has an auxiliary inlet in communication with the living area for receiving the cooled air therefrom and an auxiliary outlet in communication with the living area for expelling air thereto. Lastly, a heat transfer mechanism includes a pipe formed in the shape of a helix. In use, the heat transfer mechanism is adapted to transfer heat from the air expelled through the exhaust vent to the air situated within the housing such that the heated air may be directed to the living area.

Air-heating gas stoves; air-moisteners; ovens. —The stove is enclosed within a casing h, which is provided with inlet openings m for air to be heated, outlets n for heated air and gaseous pro-ducts of combustion, a door leading to the oven d, and tubes i for introducing water to the water seals f. Within the casing is a receptacle a, forming a grate or a space for the gas burner, above which are placed in succession the hollow drums b, c, e. Each drum has at its bottom a short open-ended tube dipping into a water seal-mounted on the top of the next lower drum. The largest drum is provided with the hot chamber d for baking, boiling, warming, or the like. If gas is used, the heated air and products of combustion, mixed with water vapour, escape together into the air, and may be drawn off by a fan rotated by the escaping vapours. If solid fuel is used, the heated air and products of combustion are kept separate, the latter being led to a flue.

Water-tube boilers; combined with industrial furnaces, kilns, and ovens; generating by indirect contact of heated gases. In a water-tube boiler heated by the waste gases from an industrial furnace, kiln, or oven, the gases are drawn through the passes among the tubes by a fan so operating that, when the boiler is working at rated capacity, the weight of gas drawn per sq. ft. of average flow area is at least two thousand pounds per hour, and the desired draught is maintained at the outlet from the furnace &c. The Babcock-Wilcox boiler shown has additional rows of tubes and is fitted with vertical baffles 9 arranged so as to give three passes of equal sectional areas. The waste gases enter at the bottom 10 of the front pass and are drawn through the boiler by a fan 13. The inlet 10 may be connected to a by-pass flue leading from the stack of a regenerative open-hearth furnace, and the gases may be discharged through a branch flue 21 opening into the stack, dampers being provided to control the flow of gases into and from the boiler. In a Babcock-Wilcox boiler having 18 transverse rows of tubes and 10 vertical rows and fitted with vertical baffles giving four passes each of 12.2 sq. ft. area, the gases are drawn at a rate of 23,400 lb. per sq. ft. per hour, the draught produced by the fan being 3.1 inches, which, allowing a drop of say 1.32 inches in the boiler, gives a draught of about 1.5 inches at the furnace outlet.

While these heat exchange systems may be suitable for the purposes for which they were designed, they would not be as suitable for the purposes of the present invention, as hereinafter described.

SUMMARY OF THE PRESENT INVENTION

The present invention relates generally to heating systems and, more specifically, to a heating recovery apparatus designed to recover lost heat from a primary heating source. The apparatus is used in conjunction with a boiler and/or furnace. The apparatus includes a jacket for a flue having conduit clad in heatsinks and a fan moving air across a channel and discharged into a plenum. The apparatus also includes a fan positioned within to expel gases. An exteriorly positioned fan control mechanism with temperature display is in communication with temperature sensors and serves to activate the fans.

A primary object of the present invention is to provide a heat recovery apparatus able to over come the short comings of the prior art.

Another secondary object of the present invention is to provide a heat recovery apparatus that recovers lost heat from a conventional gas furnace or heating unit.

Another object of the present invention is to provide a heat recovery apparatus that is retrofitted into the chimney and plenum of a conventional gas furnace or heating unit.

Yet another object of the present invention is to provide a heat recovery apparatus that utilizes conduit having a plurality of heat sinks positioned on an external surface thereof for releasing heat though the plurality of heat sinks.

Still yet another object of the present invention is to provide a heat recovery apparatus that utilizes dual fans with independent themisters to control the heat and carbon monoxide release from within the heat extractor.

Another object of the present invention is to provide a heat recovery apparatus that utilizes the plurality of fans control the heat release.

A further object of the present invention is to provide a heat recovery apparatus wherein a user definable temperature control is connected to the plurality of fans for controlling the activation and operation thereof.

Still another object of the present invention is to provide a heat recovery apparatus that improves the efficiency and reduces the cost of existing heating systems.

Still another object of the present invention is to provide a heat recovery apparatus that provides a safe and economical means to improve a heating system.

Another object of the present invention is to provide a heat recovery apparatus that is simple and easy to use.

A still further object of the present invention is to provide a heat recovery apparatus that is economical in cost to manufacture.

Additional objects of the present invention will appear as the description proceeds.

The present invention overcomes the shortcomings of the prior art by providing a heat recovery system that recovers lost heat from a conventional gas furnace or heating unit by means that utilizes dual fans with independent themisters, digital temperature readings, and user settings to control the heat and carbon monoxide release.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
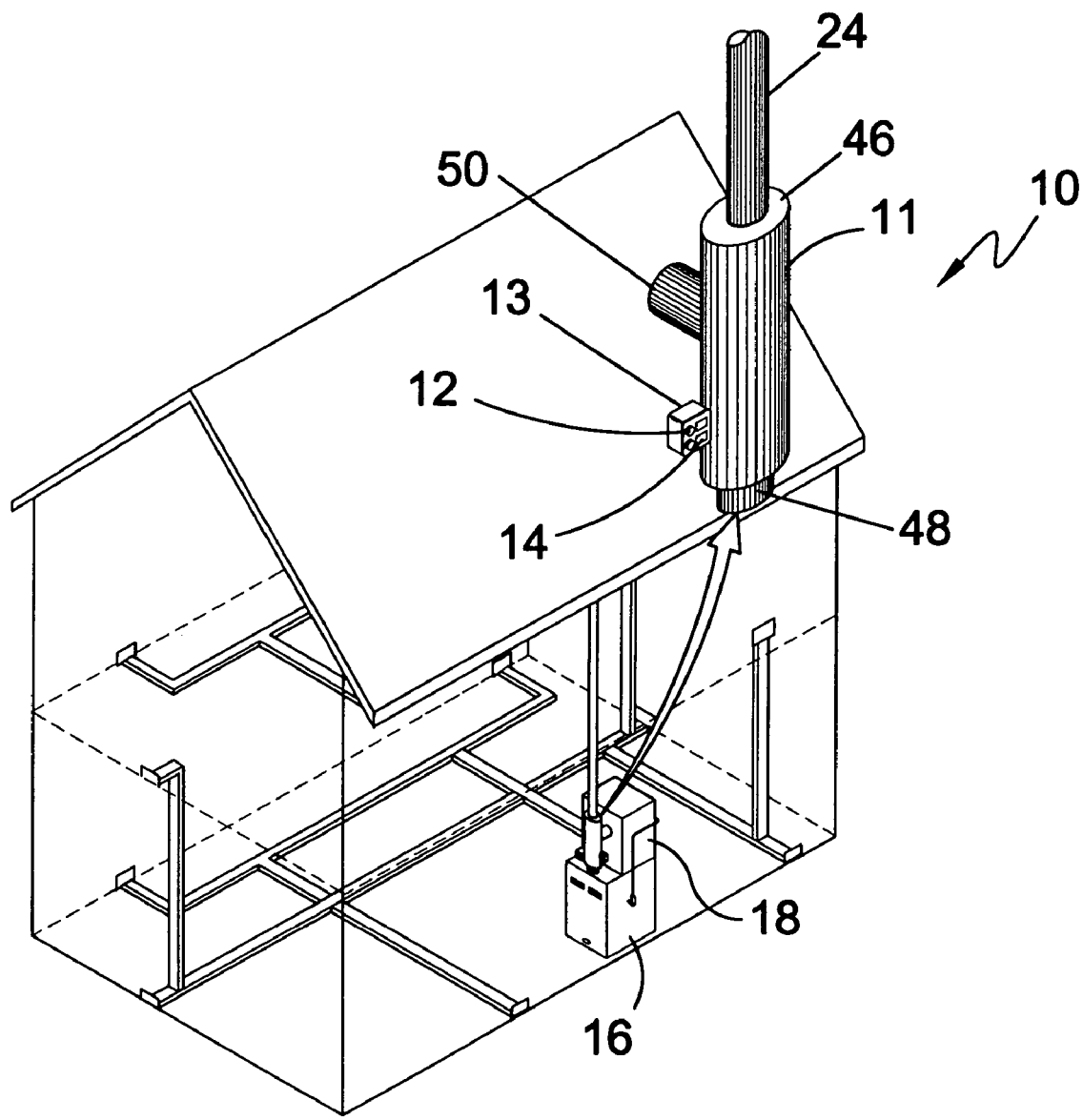
FIG. 1 is an illustrative view of the heat recovery apparatus of the present invention in use.

Turning now descriptively to the drawings, in which similar reference characters denote similar elements throughout the several views, the Figures illustrate the heat recovery apparatus of the present invention. With regard to the reference numerals used, the following numbering is used throughout the various drawing Figures.

10 heat recovery apparatus of the present invention
11 housing
12 fan controls
13 fan control box
14 temperature readout
15 face of fan control box
16 electric furnace
18 plenum
20 electric connection
22 condensate drain
24 chimney/PVC pipe
26 chimney fan
28 insulated coating
30 heat sinks
31 first opening
32 conduit
33 second opening
34 condensate trap
36 main thermistor
38 plenum fan
40 plenum insert
42 plenum thermometer
44 chimney thermometer
46 first end of heat recovery apparatus
48 second end of heat recovery apparatus
50 channel
51 vents around chamber

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments; practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1-7 illustrate the heat recovery apparatus of the present invention which is indicated generally by the numeral 10.

FIG. 1 is an illustrative view of the heat recovery apparatus 10 of the present invention in use. Typical home heating systems include a primary heat source 16 connected to a plenum 18 and further includes an conduit 24 for expelling gases produced during the process of generating heat. The primary heating source 16 is shown herein as an electric furnace. However, the primary heat source being an electric furnace is described for purposes of example only and the primary heat source 16 may include any electric, gas or oil powered heat source. The electric furnace 16 generates the heat used to warm the home. The plenum 18 is further connected to a distribution network 17 for distributing the heat throughout a structure. Preferably, the distribution network is formed by at least one of a plurality of ducts or pipes connected in a predetermined arrangement.

The heat recover apparatus 10 of the present invention is connected between each of the primary heat source 16, the expulsion conduit 48, and the plenum 18. The primary purpose of the apparatus 10 of the present invention is to recover additional heat that is a byproduct of the heat generation process. Typically, the additional heat is mixed with harmful gases which are expelled via the expulsion conduit 48. The present invention recovers this additional heat while still expelling the harmful gases produced by the primary heat source.

The heat recovery apparatus 10 includes a housing 11. The housing 11 has a first end 46 and a second end 48, opposite said first end 46. The first end 46 of the housing 11 is attached to a chimney or PVC pipe 24 for expelling harmful gases therefrom. The second end 48 of the housing 11 is attached to the primary heat source 16. A channel 50 extends from the external side of the housing 11 for connecting the housing 11 to the plenum 18. The plenum 18 aids in injecting the heat into the home for warmth.

As will be discussed hereinafter, the primary heat source 16 produces heat that is captured in the plenum 18 for distribution via the network 17. Simultaneously, the byproduct of the heat production process is received within the housing 11 of the heat recovery apparatus 10 of the present invention. The additional heat contained in the byproduct will be extracted and further inserted, via the channel 50, into the plenum 18 for further distribution via the network 17. The process of recovering the additional heat will be discussed hereinafter with specific respect to FIGS. 2-7. While recovering the heat, the apparatus 10 of the present invention includes a mechanism for expelling any harmful gas or particulate matter via the chimney 24 resulting from the heat generation process.

Figure 2:
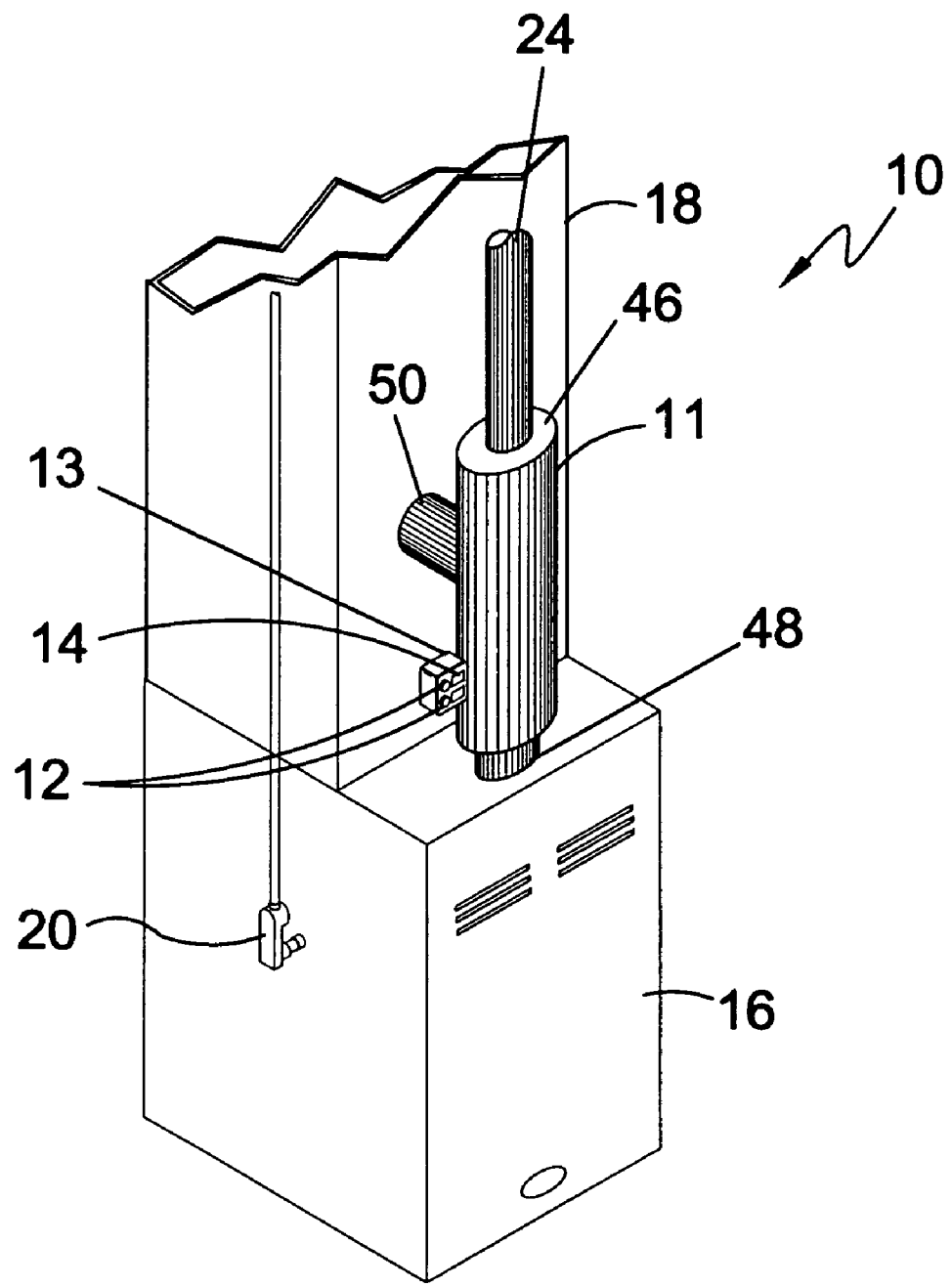
FIG. 2 is a perspective view of the heat recovery apparatus of the present invention.
Figure 3:
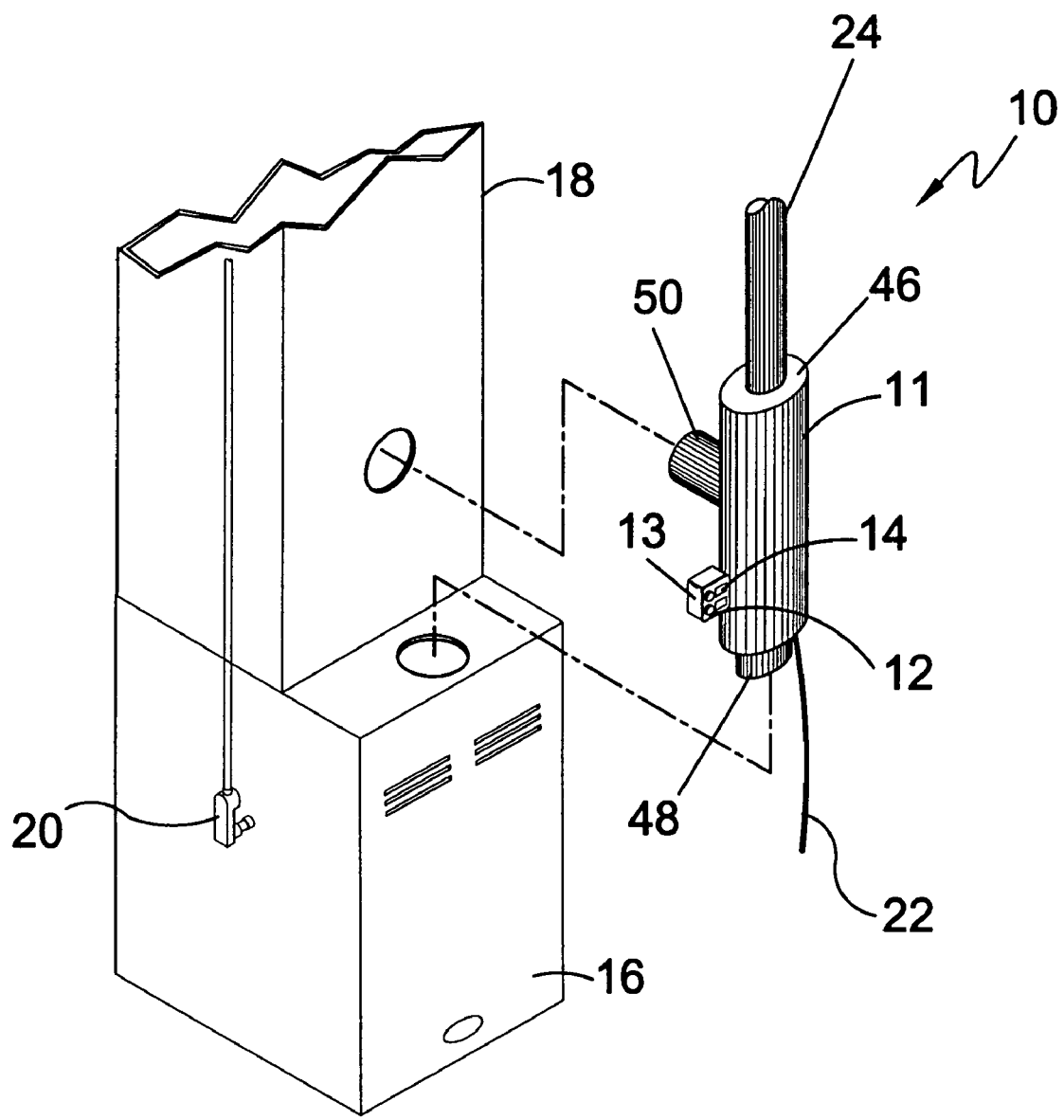
FIG. 3 is an exploded view of the heat recovery apparatus of the present invention.

FIG. 2 is a perspective view of the heat recovery apparatus 10 of the present invention. The heat recovery apparatus 10 includes the housing 11. The first end 46 of the housing 11 is opposite from the second end 48 of the housing 11. The first end 46 of the housing 11 is connected to the chimney or PVC pipe 24 and is used to expel carbon monoxide and other harmful gases from the home. The second end 48 of the housing 11 is attached to the primary heat source 16, hereinafter referred to as the electric furnace. The electric furnace 16 generates the heat used to warm the home. An electrical input 20 positioned on an external side of the furnace 16 supplies the electricity to the furnace 16. The housing 11 of the apparatus 10 of the present invention is further connected to the plenum 18 via the channel 50. The plenum 18 aids in injecting the heat produced by the furnace 16 into the home for warmth. As will be discussed hereinafter with specific reference to FIG. 4, the housing includes a plenum fan 38 and a chimney fan 26. The plenum fan 38 draws the heat in the housing into the plenum 18 whereas the chimney fan 26 causes any harmful gases to be removed from within the housing.

The apparatus 10 of the present invention is selectively controlled by the user. A control box 13 is positioned on an external surface of the housing 11 and includes a plurality of control mechanisms thereon. The control box 13 includes a plurality of temperature read outs 14 and a plurality of fan controls 12. These fan controls 12 allow the use to determine the intensity and amount of heat dispersed into the structure by the plenum fan 38 as well as the activation of the chimney fan 26 for removal of gases from within the housing. Each fan 26 and 38 has its own individual temperature read out 14. The temperature read out 14 indicates the temperature of the air going through each fan 26 and 38.

Figure 4:
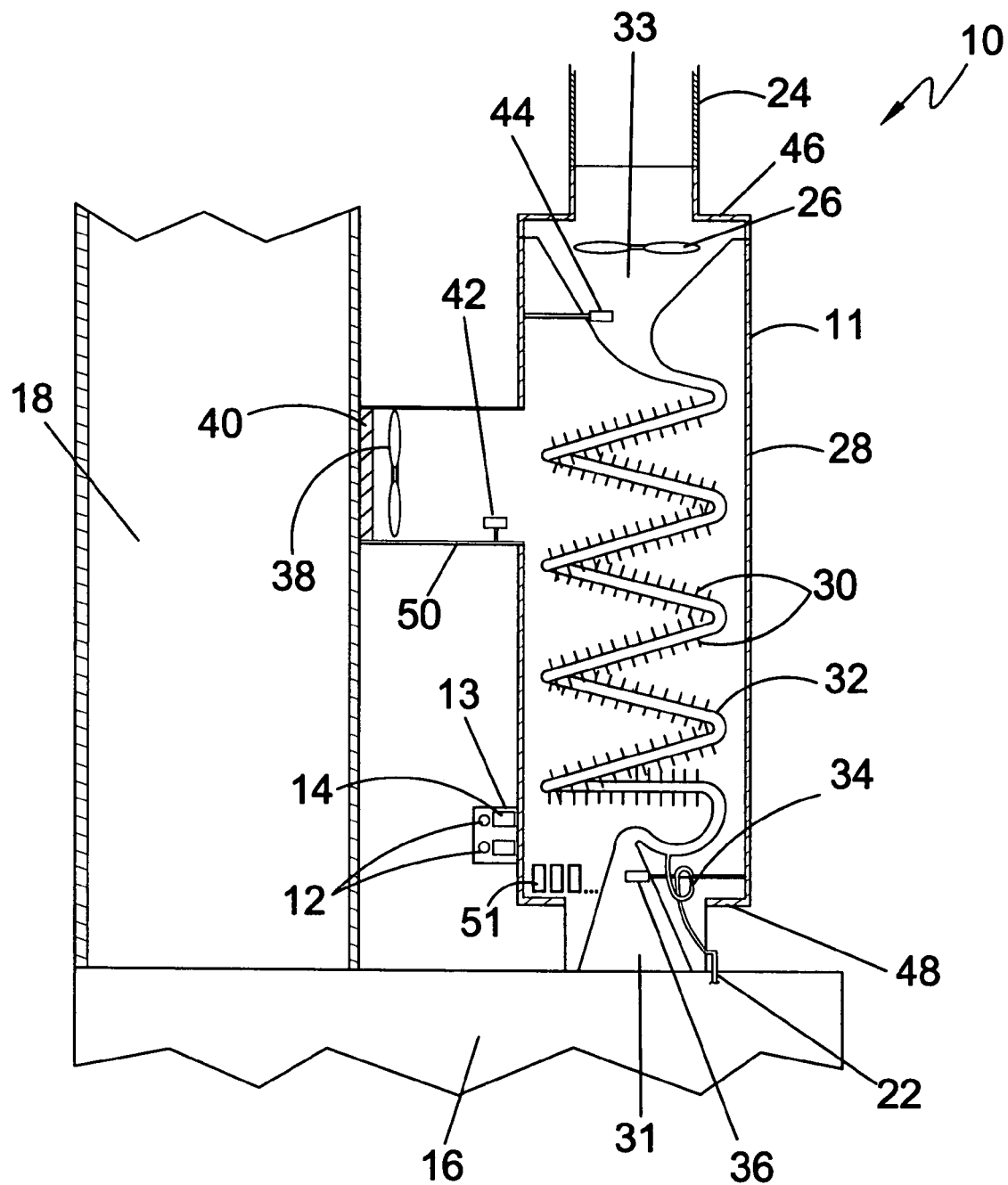
FIG. 4 is a sectional view of the heat recovery apparatus of the present invention.

A conduit 32, as shown in FIG. 4, is located inside the housing 11. As the heat is released, the air and gases inside the conduit 32 are cooled. The cooling air and gases causes condensate (moisture) to build up on the inside of the conduit 32. This condensate then flows down the conduit 32 into a condensate drain trap 34, shown in FIG. 4 and into a condensate drain 22, which is external to the housing 11.

FIG. 4 is a sectional view of the heat recovery apparatus 10 of the present invention. The heat recovery apparatus 10 includes the housing 11. The housing 11 has an insulated coating 28 surrounding it. The first end 46 of the housing 11 is connected to the chimney 24 and is used to expel carbon monoxide and other harmful gases produced during the heat production process. The second end 48 of the housing 11 is connected to the electric furnace 16 and collects gas produced thereby during the heating process. The housing 11 further includes a conduit 32 having a first opening 33 adjacent the first end 46 of the housing and a second opening 31, adjacent the second end 48. The conduit 32 is thus connected between an opening of the first end 46 and an opening of the second end 48. The conduit 32 includes a plurality of heat sinks 30 positioned on exterior surface thereof and extending into the interior compartment of the housing 11. The conduit 32 further includes a main thermistor positioned within the second opening 31 adjacent the second end 48 of the housing 11. Additionally, extending from a section of the conduit adjacent to the second end is a condensate trap 34 which further connects to a condensate drain 34. The condensate trap 34 extends from an aperture adjacently located to the second opening 31 of the conduit 32.

The apparatus 10 of the present invention further includes the plenum fan 38 positioned within the channel 50 which connects the housing 11 to the plenum 18. A plenum insert 40, for securing the channel 50 to the plenum 18 is positioned between the plenum fan 38 and opening to the plenum 18. A plenum thermometer 42 is positioned within the channel 50 adjacent the plenum fan 38 and is able to sense the temperature of air passing therethrough.

Positioned adjacent the first end 46 of the housing 11 and within first opening 33 of the conduit 32 is the chimney fan 26. The chimney fan 26 expels the carbon monoxide and other undesirable gases into the chimney 24 and out from the home. A chimney thermometer 44 is positioned within the conduit 32 for sensing the temperature of the air being expelled thereby.

The control box 13 is positioned on the exterior surface of the housing 11 and includes fan controls 12 and temperature displays 14. Each of the plenum fan 38 and the chimney fan 26 are electrically connected to the control box 13 and are controlled by a respective one of the fan controls 12. Additionally, the thermometers 42, 44 are also connected to the control box 13 and further connected to the temperature displays 14. The main thermistor 36 is also connected to the control box 13 which includes circuitry for operating the apparatus 10 of the present invention. Specifically, when the furnace 16 produces heat the thermistor 36 becomes electrically conductive and completes a circuit which causes the heat recovery apparatus 10 to begin operation by activating each of the plenum fan 38 and the chimney fan 26.

Upon activation of the apparatus 10, the conduit 32 at the second end 48 of the housing collects the gas produced by the furnace 16. The chimney fan 26 helps draw the gas produced by the furnace 16 through the conduit 32. The temperature of the heat sinks 30 increases as the gas passes along the length of the conduit 32. As the gas flows from inside the conduit 32, the heat is absorbed and released by a plurality of heat sinks 30. The heat sinks 30 extend outwardly along the length of the conduit 32 and the release heat into the inner compartment of the housing 11. The plenum fan 38 transfers the heat released by the heat sinks 30 into the plenum 18 to further support the heating of the home. The plenum thermometer 42 senses the temperature of the air passing through the channel 50 and provides a signal representing a temperature value to the control box 13. The received plenum temperature value is displayed in the temperature read out 14 located on the fan control box 13. The fan control box 13 also includes the plurality of fan controls 12 to determine the speed of the plenum fan 38 which will optimize the amount of heat injected into the home.

The chimney fan 26 continues to draw the gas along the length of the conduit 32 until it reaches the first opening 33. The chimney fan 26 then causes the gas to be expelled from the structure via the chimney 24 thereby removing any hazardous gas and/or particulate matter. The gas passes around the chimney thermometer 44 which senses the temperature of thereof and sends a signal representing a temperature value to the fan control box 13. The temperature of the air passing through the chimney fan 26 is displayed in the temperature read out 14 located on the fan control box 13.

As the heat is released, the air and gases inside the conduit 32 is cooled. The cooling air and gases causes condensate (moisture) to build up on the inside of the conduit 32. Gravity causes the condensate to flow downward in the direction of the second end of the housing 11 along the conduit 32 and into the condensate drain trap 34. As the condensate collects in the trap 34, the condensate moves into the condensate drain 22, which is external to the housing 11, and further out from the housing.

Figure 5:
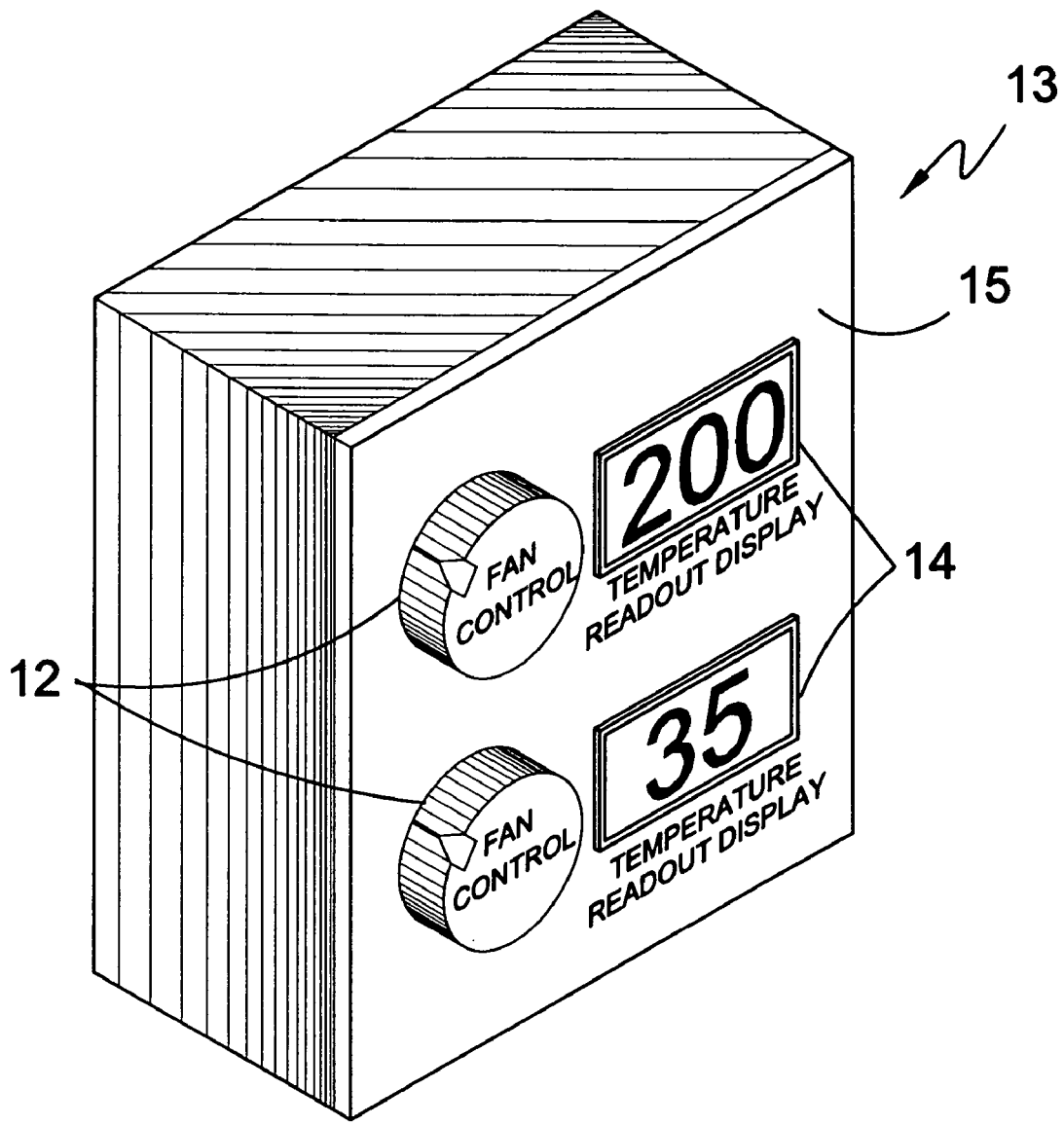
FIG. 5 is a perspective view of the fan control box 13 of the heat recovery apparatus 10 of the present invention.

FIG. 5 is a perspective view of the fan control box 13 of the heat recovery apparatus 10 of the present invention. The fan control box 13 shown herein is rectangular in shape. However, the fan control box 13 can be of any geometric shape. The face 15 of the fan control box 13 includes two temperature read out displays 14. Each temperature read out 14 represents the one of the fans 26 and 38. The temperature read out 14 shows the temperature of the air passing through the fans 26 and 38. Located next to each temperature read out 14 is the fan control 12. Each fan control 12 corresponds to one of the two fans 26 and 38. The fan control 12 determines the speed of the plenum fan 38 to optimize the amount of heat injected into the home and the speed of the chimney fan 26 to optimize the amount of carbon monoxide and other gases expulsion from the home.

Figure 6:
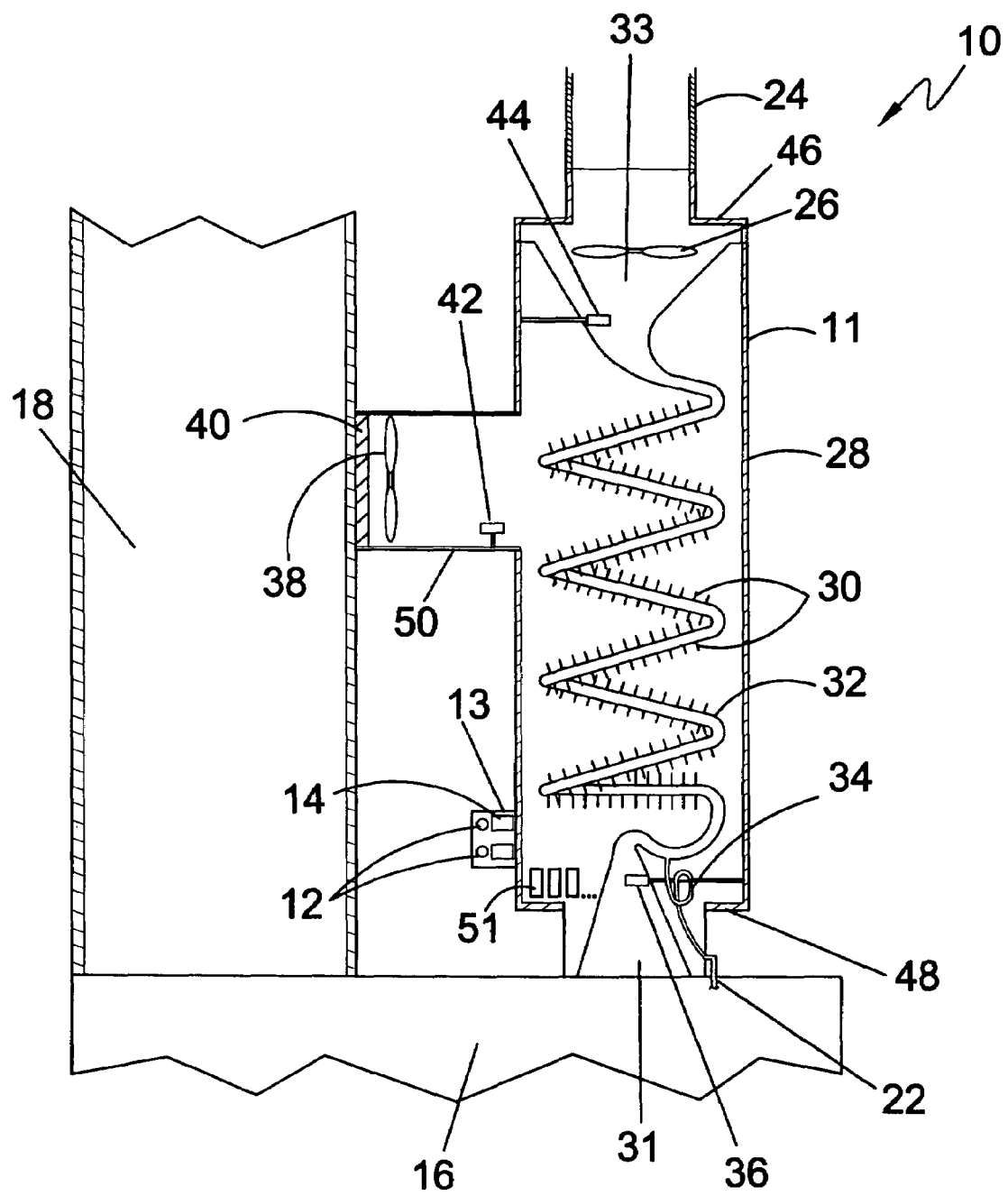
FIG. 6 is a sectional view of the heat recovery apparatus of the present invention.

FIG. 6 is a sectional view of the heat recovery apparatus 10 of the present invention. The heat recovery apparatus 10 includes the housing 11. The housing 11 has an insulated coating 28 surrounding it. The first end 46 of the housing 11 is connected to the chimney 24 and is used to expel carbon monoxide and other harmful gases produced during the heat production process. The second end 48 of the housing 11 is connected to the electric furnace 16 and collects gas produced thereby during the heating process. The housing 11 further includes a conduit 32 having a first opening 33 adjacent the first end 46 of the housing and a second opening 31, adjacent the second end 48. The conduit 32 is thus connected between an opening of the first end 46 and an opening of the second end 48. The conduit 32 includes a plurality of heat sinks 30 positioned on exterior surface thereof and extending into the interior compartment of the housing 11. The conduit 32 further includes a main thermistor positioned within the second opening 31 adjacent the second end 48 of the housing 11. Additionally, extending from a section of the conduit adjacent to the second end is a condensate trap 34 which further connects to a condensate drain 34. The condensate trap 34 extends from an aperture adjacently located to the second opening 31 of the conduit 32.

The apparatus 10 of the present invention further includes the plenum fan 38 positioned within the channel 50 which connects the housing 11 to the plenum 18. A plenum insert 40, for securing the channel 50 to the plenum 18 is positioned between the plenum fan 38 and opening to the plenum 18. A plenum thermometer 42 is positioned within the channel 50 adjacent the plenum fan 38 and is able to sense the temperature of air passing therethrough.

Positioned adjacent the first end 46 of the housing 11 and within first opening 33 of the conduit 32 is the chimney fan 26. The chimney fan 26 expels the carbon monoxide and other undesirable gases into the chimney 24 and out from the home. A chimney thermometer 44 is positioned within the conduit 32 for sensing the temperature of the air being expelled thereby.

The control box 13 is positioned on the exterior surface of the housing 11 and includes fan controls 12 and temperature displays 14. Each of the plenum fan 38 and the chimney fan 26 are electrically connected to the control box 13 and are controlled by a respective one of the fan controls 12. Additionally, the thermometers 42, 44 are also connected to the control box 13 and further connected to the temperature displays 14. The main thermistor 36 is also connected to the control box 13 which includes circuitry for operating the apparatus 10 of the present invention. Specifically, when the furnace 16 produces heat the thermistor 36 becomes electrically conductive and completes a circuit which causes the heat recovery apparatus 10 to begin operation by activating each of the plenum fan 38 and the chimney fan 26.

Upon activation of the apparatus 10, the conduit 32 at the second end 48 of the housing collects the gas produced by the furnace 16. The chimney fan 26 helps draw the gas produced by the furnace 16 through the conduit 32. The temperature of the heat sinks 30 increases as the gas passes along the length of the conduit 32. As the gas flows from inside the conduit 32, the heat is absorbed and released by a plurality of heat sinks 30. The heat sinks 30 extend outwardly along the length of the conduit 32 and the release heat into the inner compartment of the housing 11. The plenum fan 38 transfers the heat released by the heat sinks 30 into the plenum 18 to further support the heating of the home. The plenum thermometer 42 senses the temperature of the air passing through the channel 50 and provides a signal representing a temperature value to the control box 13. The received plenum temperature value is displayed in the temperature read out 14 located on the fan control box 13. The fan control box 13 also includes the plurality of fan controls 12 to determine the speed of the plenum fan 38 which will optimize the amount of heat injected into the home.

The chimney fan 26 continues to draw the gas along the length of the conduit 32 until it reaches the first opening 33. The chimney fan 26 then causes the gas to be expelled from the structure via the chimney 24 thereby removing any hazardous gas and/or particulate matter. The gas passes around the chimney thermometer 44 which senses the temperature of thereof and sends a signal representing a temperature value to the fan control box 13. The temperature of the air passing through the chimney fan 26 is displayed in the temperature read out 14 located on the fan control box 13.

As the heat is released, the air and gases inside the conduit 32 is cooled. The cooling air and gases causes condensate (moisture) to build up on the inside of the conduit 32. Gravity causes the condensate to flow downward in the direction of the second end of the housing 11 along the conduit 32 and into the condensate drain trap 34. As the condensate collects in the trap 34, the condensate moves into the condensate drain 22, which is external to the housing 11, and further out from the housing.

Figure 7:
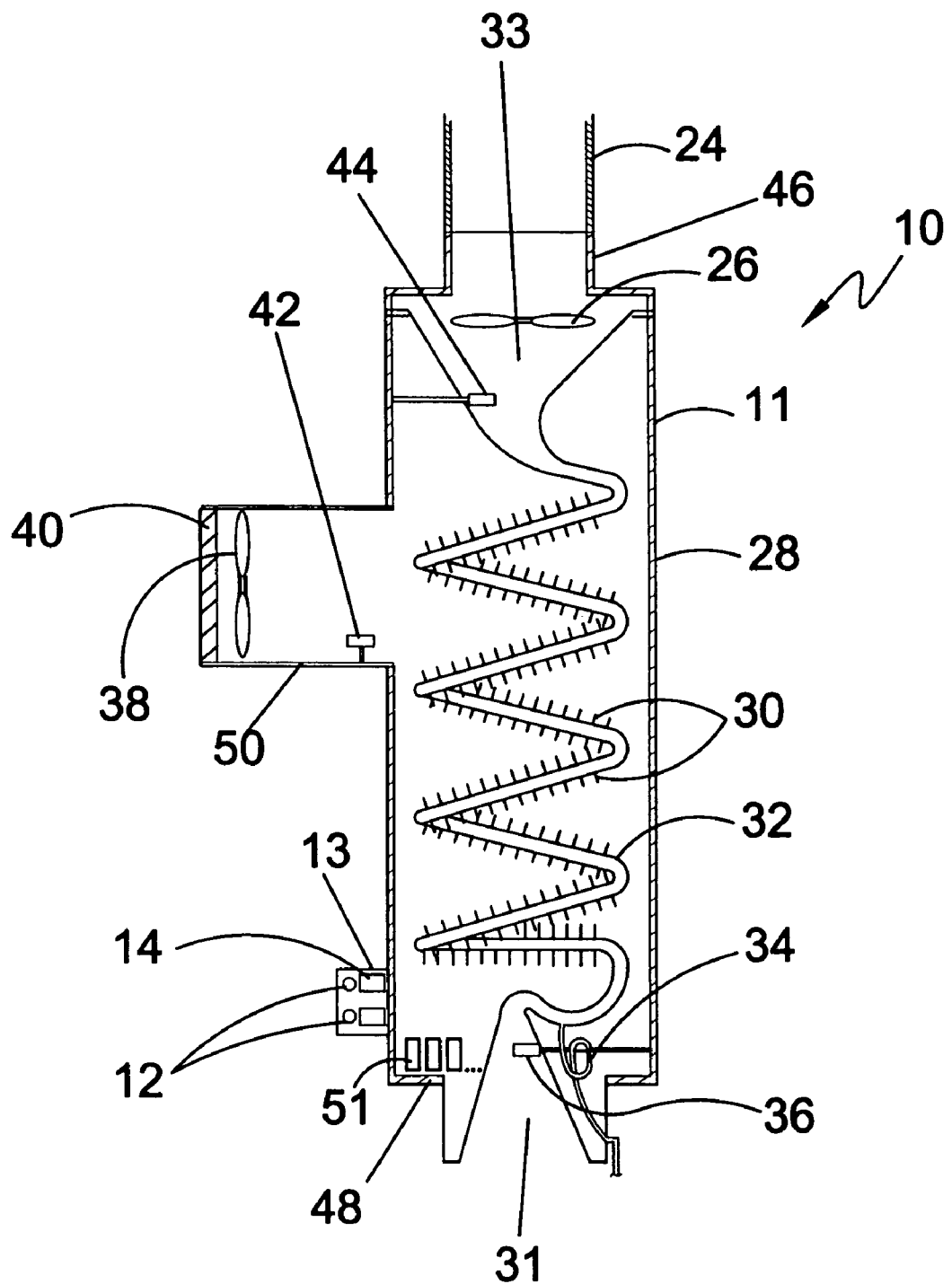
FIG. 7 is a sectional view of the heat recovery apparatus of the present invention.

FIG. 7 is a sectional view of the heat recovery apparatus 10 of the present invention. The heat recovery apparatus 10 includes the housing 11. The housing 11 has an insulated coating 28 surrounding it. The first end 46 of the housing 11 is connected to the chimney 24 and is used to expel carbon monoxide and other harmful gases produced during the heat production process. The second end 48 of the housing 11 is connected to the electric furnace 16 and collects gas produced thereby during the heating process. The housing 11 further includes a conduit 32 having a first opening 33 adjacent the first end 46 of the housing and a second opening 31, adjacent the second end 48. The conduit 32 is thus connected between an opening of the first end 46 and an opening of the second end 48. The conduit 32 includes a plurality of heat sinks 30 positioned on exterior surface thereof and extending into the interior compartment of the housing 11. The conduit 32 further includes a main thermistor positioned within the second opening 31 adjacent the second end 48 of the housing 11. Additionally, extending from a section of the conduit adjacent to the second end is a condensate trap 34 which further connects to a condensate drain 34. The condensate trap 34 extends from an aperture adjacently located to the second opening 31 of the conduit 32.

The apparatus 10 of the present invention further includes the plenum fan 38 positioned within the channel 50 which connects the housing 11 to the plenum 18. A plenum insert 40, for securing the channel 50 to the plenum 18 is positioned between the plenum fan 38 and opening to the plenum 18. A plenum thermometer 42 is positioned within the channel 50 adjacent the plenum fan 38 and is able to sense the temperature of air passing therethrough.

Positioned adjacent the first end 46 of the housing 11 and within first opening 33 of the conduit 32 is the chimney fan 26. The chimney fan 26 expels the carbon monoxide and other undesirable gases into the chimney 24 and out from the home.

A chimney thermometer 44 is positioned within the conduit 32 for sensing the temperature of the air being expelled thereby.

The control box 13 is positioned on the exterior surface of the housing 11 and includes fan controls 12 and temperature displays 14. Each of the plenum fan 38 and the chimney fan 26 are electrically connected to the control box 13 and are controlled by a respective one of the fan controls 12. Additionally, the thermometers 42, 44 are also connected to the control box 13 and further connected to the temperature displays 14. The main thermistor 36 is also connected to the control box 13 which includes circuitry for operating the apparatus 10 of the present invention. Specifically, when the furnace 16 produces heat the thermistor 36 becomes electrically conductive and completes a circuit which causes the heat recovery apparatus 10 to begin operation by activating each of the plenum fan 38 and the chimney fan 26.

Upon activation of the apparatus 10, the conduit 32 at the second end 48 of the housing collects the gas produced by the furnace 16. The chimney fan 26 helps draw the gas produced by the furnace 16 through the conduit 32. The temperature of the heat sinks 30 increases as the gas passes along the length of the conduit 32. As the gas flows from inside the conduit 32, the heat is absorbed and released by a plurality of heat sinks 30. The heat sinks 30 extend outwardly along the length of the conduit 32 and the release heat into the inner compartment of the housing 11. The plenum fan 38 transfers the heat released by the heat sinks 30 into the plenum 18 to further support the heating of the home. The plenum thermometer 42 senses the temperature of the air passing through the channel 50 and provides a signal representing a temperature value to the control box 13. The received plenum temperature value is displayed in the temperature read out 14 located on the fan control box 13. The fan control box 13 also includes the plurality of fan controls 12 to determine the speed of the plenum fan 38 which will optimize the amount of heat injected into the home.

The chimney fan 26 continues to draw the gas along the length of the conduit 32 until it reaches the first opening 33. The chimney fan 26 then causes the gas to be expelled from the structure via the chimney 24 thereby removing any hazardous gas and/or particulate matter. The gas passes around the chimney thermometer 44 which senses the temperature of thereof and sends a signal representing a temperature value to the fan control box 13. The temperature of the air passing through the chimney fan 26 is displayed in the temperature read out 14 located on the fan control box 13.

As the heat is released, the air and gases inside the conduit 32 is cooled. The cooling air and gases causes condensate (moisture) to build up on the inside of the conduit 32. Gravity causes the condensate to flow downward in the direction of the second end of the housing 11 along the conduit 32 and into the condensate drain trap 34. As the condensate collects in the trap 34, the condensate moves into the condensate drain 22, which is external to the housing 11, and further out from the housing.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications

What is claimed is new and desired to be protected by Letters Patent is set forth in the appended claims:

1. An apparatus for extracting heat from a heat source comprising:
   a) a housing having a first end with a first opening and a second end with a second opening, wherein the housing includes an internal compartment therein, wherein said first end of said housing is connected to said heat source, said heat source being a furnace;
   b) a channel extending from said housing for providing access to said internal compartment;
   c) a generally vertically extending hollow conduit positioned within said internal compartment extending between said first opening and said second opening for conveying heated waste gaseous products from said furnace;
   d) a plurality of members positioned on an exterior surface of said conduit and along the length thereof to absorb heat from within said conduit and release said absorbed heat into said internal compartment creating heated air;
   e) drawing means positioned within said second opening for drawing said waste gaseous products through and expelling said waste gaseous products from said conduit;
   f) mixing means positioned within said channel for moving said heated air out from said internal compartment to a second compartment, said second compartment attached to and receiving heat directly from said furnace; and
   g) activating means connected to said drawing means and said mixing means for activating said apparatus.

2. The apparatus as recited in claim 1, wherein said drawing means is a first fan operatively connected to said activating means.

3. The apparatus as recited in claim 2, wherein said mixing means is a second fan operatively connected to said activating means.

4. The apparatus as recited in claim 3, wherein said activating means is a thermistor electrically connected to each of said drawing means and said moving means.

5. The apparatus as recited in claim 4, wherein said second compartment is a plenum and said plenum is connected to a distribution network for distributing said heated air.

6. The apparatus as recited in claim 5, wherein said distribution network comprises at least one of a plurality of ducts in a predetermined pattern and a plurality of pipe in a predetermined pattern.

7. The apparatus as recited in claim 6, further comprising an expulsion pipe connected at said second end of said housing for aiding in expelling said gaseous waste products from said conduit.

8. The apparatus as recited in claim 7, wherein said plurality of members are heat sinks.

9. The apparatus as recited in claim 8, further comprising a draining mechanism extending from said conduit adjacent said first opening for draining condensate formed in said conduit.

10. The apparatus as recited in claim 9, further comprising a control box for controlling said apparatus.

11. The apparatus as recited in claim 10, wherein said control box includes a plurality of controls for controlling at least one of said drawing means and said mixing means.

12. The apparatus as recited in claim 11, further comprising a first thermometer positioned within said housing and extending into said conduit at said second end thereof for sensing a temperature of said waste gaseous products being expelled therefrom.

13. The apparatus as recited in claim 12, further comprising a second thermometer positioned within said channel for sensing a temperature of said heated air within said inner compartment.

14. The apparatus as recited in claim 13, wherein said control box further comprises a plurality of display screens for selectively displaying a value representing said sensed temperature of each of said expelled waste gaseous products and said heated air.

15. An apparatus for extracting waste heat from a home heat source comprising:
   a) a furnace in a building for providing heat to said building, said furnace producing heated waste gaseous products;
   b) a plenum attached to and on said furnace for distributing throughout said building heat generated by said furnace;
   c) heat recovery apparatus mounted on said furnace alongside and spaced from said plenum for recovering waste heat from said waste gaseous products and transferring said waste heat to said plenum;
   d) said heat recovery apparatus comprising a generally vertically extending waste conduit having one end for receiving said waste gaseous products from said furnace and an opposite end for discharging said waste gaseous products to the environment;
   e) said heat recovery apparatus including a housing enclosing said waste conduit, said waste conduit configured to transfer heat to air contained within said housing surrounding said conduit;
   f) said housing having vents adjacent a bottom of said housing and a channel connecting an interior of said housing to said plenum;
   g) a first fan in said channel for pumping air heated by said waste gaseous products in said conduit from said housing into said plenum;
   h) a chimney extending from an upper end of said housing communicating with said waste conduit for the discharge of said waste gaseous products;
   i) a second fan in said housing adjacent an opening into said chimney for pumping said waste gaseous products into said chimney;
   j) a thermistor mounted adjacent an opening from said furnace into said waste conduit for starting said fans when said furnace begins operation; and
   k) a control box mounted on a side of said housing for displaying temperatures of air entering said plenum from said housing and gaseous waste products entering said chimney, said control box including separate controls for each of said first and second fans to optimize the amount of heat injected into the building and the amount of gaseous waste being expelled.

* * * * *